(12) United States Patent
Reed et al.

(10) Patent No.: US 7,682,017 B2
(45) Date of Patent: Mar. 23, 2010

(54) HANDHELD PRINTER MINIMIZING PRINTING DEFECTS

(75) Inventors: William H. Reed, Lexington, KY (US); Barry B. Stout, Lexington, KY (US); Douglas Robertson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 646 days.

(21) Appl. No.: 11/431,883

(22) Filed: May 10, 2006

(65) Prior Publication Data

US 2007/0263063 A1  Nov. 15, 2007

(51) Int. Cl.
*B41J 3/36* (2006.01)
(52) U.S. Cl. ........................... 347/109; 347/108
(58) Field of Classification Search ............ 347/109, 347/108
See application file for complete search history.

(56) References Cited

U.S. PATENT DOCUMENTS

| | | | |
|---|---|---|---|
| 4,675,700 A | 6/1987 | Nagira et al. | |
| 4,758,849 A | 7/1988 | Piatt et al. | |
| 4,915,027 A * | 4/1990 | Ishibashi et al. | 101/486 |
| 4,933,867 A | 6/1990 | Ishigaki | |
| 4,942,621 A | 7/1990 | Angwin | |
| 4,947,262 A | 8/1990 | Yajima et al. | |
| 4,949,283 A | 8/1990 | Yamauchi et al. | |
| 4,949,391 A | 8/1990 | Faulkerson et al. | |
| RE33,425 E | 11/1990 | Nihei | |
| 4,999,016 A | 3/1991 | Suzuki et al. | |
| 5,013,895 A | 5/1991 | Iggulden et al. | |
| 5,024,541 A | 6/1991 | Tsukada et al. | |
| 5,028,934 A | 7/1991 | Kasai et al. | |
| 5,052,832 A | 10/1991 | Akiyama et al. | |
| 5,063,451 A | 11/1991 | Yanagisawa et al. | |
| 5,093,675 A | 3/1992 | Koumura et al. | |
| 5,110,226 A | 5/1992 | Sherman et al. | |
| 5,111,216 A | 5/1992 | Richardson et al. | |
| 5,149,980 A | 9/1992 | Ertel et al. | |
| 5,160,943 A | 11/1992 | Pettigrew et al. | |
| 5,181,521 A | 1/1993 | Lemelson | |
| 5,184,907 A | 2/1993 | Hamada et al. | |
| 5,186,558 A | 2/1993 | Sherman et al. | |
| 5,188,464 A | 2/1993 | Aaron | |
| 5,236,265 A | 8/1993 | Saito et al. | |
| 5,240,334 A | 8/1993 | Epstein et al. | |

(Continued)

FOREIGN PATENT DOCUMENTS

SE  103334  10/1941

(Continued)

*Primary Examiner*—Manish S Shah

(57) ABSTRACT

Methods and apparatus include a handheld printer manipulated back and forth by an operator during use to print an image. An inkjet printhead of the printer has a plurality of fluid firing actuators arranged in a substantial column. A controller communicates with the printhead to identify active actuators given to fire at a particular time during use to print the image. However, to prevent unsightly print quality from occurring during overlapping adjacent print swaths, for example, certain of the identified actuators are prevented from firing. Especially, actuators in the column further from a center of the column fire less frequently than those closer to the center. A position sensor is also used to locate the printhead relative to the image. The controller correlates the position to the printhead and actuators and fires the active actuators or not.

17 Claims, 9 Drawing Sheets

U.S. PATENT DOCUMENTS

| | | | |
|---|---|---|---|
| 5,262,804 A | 11/1993 | Petigrew et al. |
| 5,267,800 A | 12/1993 | Petteruti et al. |
| 5,308,173 A | 5/1994 | Amano et al. |
| 5,311,208 A | 5/1994 | Burger et al. |
| 5,312,196 A | 5/1994 | Hock et al. |
| 5,344,248 A | 9/1994 | Schoon et al. |
| 5,355,146 A | 10/1994 | Chiu et al. |
| 5,446,559 A | 8/1995 | Birk |
| 5,449,238 A | 9/1995 | Pham et al. |
| 5,462,375 A | 10/1995 | Isobe et al. |
| 5,475,403 A | 12/1995 | Havlovick et al. |
| 5,488,675 A | 1/1996 | Hanna |
| 5,501,535 A | 3/1996 | Hastings et al. |
| 5,503,483 A | 4/1996 | Petteruti et al. |
| 5,520,470 A | 5/1996 | Willett |
| 5,578,813 A | 11/1996 | Allen et al. |
| 5,581,629 A | 12/1996 | Hanna et al. |
| 5,593,236 A | 1/1997 | Bobry |
| 5,634,730 A | 6/1997 | Bobry |
| 5,644,139 A | 7/1997 | Allen et al. |
| 5,650,820 A | 7/1997 | Sekine et al. |
| 5,664,139 A | 9/1997 | Spurlock |
| 5,685,651 A | 11/1997 | Hayman et al. |
| 5,686,720 A | 11/1997 | Tullis |
| 5,729,008 A | 3/1998 | Blalock et al. |
| 5,786,804 A | 7/1998 | Gordon |
| 5,806,993 A | 9/1998 | Petteruti et al. |
| 5,816,718 A | 10/1998 | Poole |
| 5,825,044 A | 10/1998 | Allen et al. |
| 5,825,995 A | 10/1998 | Wiklof et al. |
| 5,829,893 A | 11/1998 | Kinoshita et al. |
| 5,842,793 A | 12/1998 | Katayama et al. |
| 5,848,848 A | 12/1998 | St. Jean |
| 5,848,849 A | 12/1998 | Kishi et al. |
| 5,850,243 A | 12/1998 | Kinoshita et al. |
| 5,853,251 A | 12/1998 | Imai |
| 5,862,753 A | 1/1999 | Dolan et al. |
| 5,887,992 A | 3/1999 | Yamanashi |
| 5,892,523 A | 4/1999 | Tanaka et al. |
| 5,927,827 A | 7/1999 | Reuter et al. |
| 5,927,872 A | 7/1999 | Yamada |
| 5,953,497 A | 9/1999 | Kokubo et al. |
| 5,984,455 A | 11/1999 | Anderson |
| 5,988,900 A | 11/1999 | Bobry |
| 5,997,193 A | 12/1999 | Petteruti et al. |
| 6,004,053 A | 12/1999 | Petteruti et al. |
| 6,005,681 A | 12/1999 | Pollard |
| 6,010,257 A | 1/2000 | Petteruti et al. |
| 6,017,112 A | 1/2000 | Anderson et al. |
| 6,026,686 A | 2/2000 | Hattori et al. |
| 6,062,686 A | 5/2000 | Kinoshita et al. |
| 6,076,910 A | 6/2000 | Anderson |
| 6,158,907 A | 12/2000 | Silverbrook et al. |
| 6,164,853 A | 12/2000 | Foote |
| 6,195,475 B1 | 2/2001 | Beausoleil, Jr. et al. |
| 6,203,221 B1 | 3/2001 | Tomasik et al. |
| 6,222,174 B1 | 4/2001 | Tullis et al. |
| 6,246,050 B1 | 6/2001 | Tullis et al. |
| 6,246,423 B1 | 6/2001 | Suzuki et al. |
| 6,249,360 B1 | 6/2001 | Pollard et al. |
| 6,259,826 B1 | 7/2001 | Pollard et al. |
| 6,261,011 B1 | 7/2001 | Day et al. |
| 6,270,187 B1 | 8/2001 | Murcia et al. |
| 6,270,271 B1 | 8/2001 | Fujiwara |
| 6,300,645 B1 | 10/2001 | Bohn |
| 6,303,921 B1 | 10/2001 | Hastings et al. |
| 6,312,124 B1 | 11/2001 | Desormeaux |
| 6,338,555 B1 | 1/2002 | Hirose |
| 6,347,897 B2 | 2/2002 | Huggins et al. |
| 6,357,939 B1 | 3/2002 | Baron |
| 6,364,550 B1 | 4/2002 | Petteruti |
| 6,367,993 B2 | 4/2002 | Day et al. |
| 6,373,995 B1 | 4/2002 | Moore |
| 6,379,058 B1 | 4/2002 | Petteruti et al. |
| 6,382,761 B1 | 5/2002 | Asano et al. |
| 6,394,674 B2 | 5/2002 | Huggins et al. |
| 6,398,432 B1 | 6/2002 | Day et al. |
| 6,409,401 B1 | 6/2002 | Petteruti et al. |
| 6,420,723 B2 | 7/2002 | Bohn |
| 6,429,422 B1 | 8/2002 | Bohn |
| 6,433,780 B1 | 8/2002 | Gordon et al. |
| 6,457,807 B1 | 10/2002 | Hawkins et al. |
| 6,481,905 B2 | 11/2002 | Day et al. |
| 6,503,005 B1 | 1/2003 | Cockerill et al. |
| 6,517,266 B2 | 2/2003 | Saund |
| 6,533,380 B1 * | 3/2003 | Hadimioglu et al. .......... 347/12 |
| 6,533,476 B2 | 3/2003 | Hamisch, Jr. et al. |
| 6,543,892 B2 | 4/2003 | Kubota et al. |
| 6,543,893 B2 | 4/2003 | Desormeaux |
| 6,553,459 B1 | 4/2003 | Silverbrook et al. |
| 6,568,777 B1 | 5/2003 | Anderson et al. |
| 6,572,290 B2 | 6/2003 | McCleave et al. |
| 6,583,895 B1 | 6/2003 | Kuwahara et al. |
| 6,604,874 B2 | 8/2003 | Carriere et al. |
| 6,607,316 B1 | 8/2003 | Petteruti et al. |
| 6,609,844 B1 | 8/2003 | Petteruti et al. |
| 6,623,191 B2 | 9/2003 | Huggins et al. |
| 6,626,593 B2 | 9/2003 | Doberenz |
| 6,626,597 B2 | 9/2003 | Fujiwara |
| 6,641,313 B2 | 11/2003 | Bobry |
| 6,648,528 B2 | 11/2003 | Hardisty et al. |
| 6,650,315 B2 | 11/2003 | Murai |
| 6,652,090 B2 | 11/2003 | Silverbrook |
| 6,663,222 B2 | 12/2003 | Verhoest et al. |
| 6,664,948 B2 | 12/2003 | Crane et al. |
| 6,674,543 B2 | 1/2004 | Day et al. |
| 6,686,910 B2 | 2/2004 | O'Donnell, Jr. |
| 6,742,887 B2 | 6/2004 | Ando |
| 6,769,360 B2 | 8/2004 | Walling |
| 6,846,119 B2 | 1/2005 | Walling |
| 2001/0019349 A1 | 9/2001 | Kawakami |
| 2001/0022914 A1 | 9/2001 | Iura et al. |
| 2001/0024586 A1 | 9/2001 | Day et al. |
| 2002/0033871 A1 | 3/2002 | Kaiser |
| 2002/0090241 A1 | 7/2002 | Fujiwara |
| 2002/0127041 A1 | 9/2002 | Huggins et al. |
| 2002/0154186 A1 | 10/2002 | Matsumoto |
| 2002/0158955 A1 | 10/2002 | Hess et al. |
| 2003/0031494 A1 | 2/2003 | Cockerill et al. |
| 2003/0063938 A1 | 4/2003 | Hardisty et al. |
| 2003/0117456 A1 | 6/2003 | Silverbrook et al. |
| 2004/0009024 A1 | 1/2004 | Hardisty et al. |
| 2004/0014468 A1 | 1/2004 | Walling |
| 2004/0018035 A1 | 1/2004 | Petteruti et al. |
| 2005/0018032 A1 | 1/2005 | Walling |
| 2005/0018033 A1 | 1/2005 | Walling |
| 2006/0012660 A1 | 1/2006 | Dagborn |
| 2006/0050131 A1 | 3/2006 | Breton |
| 2006/0061647 A1 | 3/2006 | Breton |
| 2006/0165460 A1 | 7/2006 | Breton |

FOREIGN PATENT DOCUMENTS

| | | |
|---|---|---|
| SE | 522047 | 1/2004 |
| SE | 527474 C2 | 3/2006 |
| WO | WO 2004056576 A1 | 7/2004 |
| WO | WO 2004056577 A1 | 8/2004 |
| WO | WO 2004088576 A1 | 10/2004 |
| WO | WO 2004103712 A1 | 12/2004 |

* cited by examiner

HANDHELD PRINTER MINIMIZING PRINTING DEFECTS

FIELD OF THE INVENTION

Generally, the present invention relates to handheld printers. Particularly, it relates to improving print quality in handheld printers of the type able to print in random motion patterns. In one aspect, stitching together overlapping print swaths is contemplated. In another, dithering per edges of columns of nozzles of an inkjet printhead is contemplated. Still other aspects relate to methods and structures for accomplishing same.

BACKGROUND OF THE INVENTION

As is known, handheld printers afford mobile convenience to users. Unlike their immobile or stationary counterparts, however, users determine the path of a given swath of printing. In some instances, this includes random movement over a substrate. In others, it includes back-and-forth movement attempting to simulate a stationary printer.

A common problem with handheld printers is poor alignment between adjacent swaths of print because position of the print element is often less accurate than with other types of printer. Alignment errors usually result in noticeable defects in the print. The most common print defects are called "print banding" and include both dark bands and white bands at the boundary between swaths where ink drops at the edge of a swath are printed too close or too far from drops in the adjacent print swath. Another category of print banding is a directional effect similar to the banded appearance of mowed glass when adjacent swaths are cut in different directions. These print banding defects may appear with other serial printers, but the defects can be minimized by printing a dithered image in multiple passes over the paper. With a handprinter, print banding is a problem because alignment errors are more likely, and requiring multiple passes is an unaccepted demand on the operator.

Another common defect with handprinting is a gap or void in the print where the operator fails to pass the print element over that portion of the page. If detected, the operator can repair the void by moving the print element back over that area so the missing content can be printed. With a handprinter, positional errors accumulate during the page, so voids that are not repaired promptly may have significant print banding where the area printed in repair is misaligned with the adjacent areas.

Accordingly, there exists a need in the art for robust, multi-directional and random printing handheld printers having improved print quality. Naturally, any improvements should further contemplate good engineering practices, such as relative inexpensiveness, stability, low complexity, ease of manufacturing, etc.

SUMMARY OF THE INVENTION

The above-mentioned and other problems become solved by applying the principles and teachings associated with the hereinafter described handheld printers that minimize printing defects. Specifically, methods and apparatus contemplate handheld printers manipulated randomly or predictably over a substrate on which an image is printed. In this regard, the printer examines which fluid firing actuators of an inkjet printhead in the printer are active to fire. From those, some are intentionally prevented from firing to create a dithered image having improved print quality, especially in contemplation of overlapped adjacent printing swaths.

With a handheld printer, the operator must overlap swaths to avoid voids or print gaps. Since swaths must overlap to some extent, this invention takes advantage of that requirement to implement selective printing or dithering in the overlap zone. Doing so places no additional demands on the operator as might if (for example) full coverage multiple passes of the printer were required to reduce banding.

In one aspect, the handheld printer includes a position sensor, a controller and a printhead. The sensor provides the location of the printhead and the controller correlates the actuators of the printhead to a to-be-printed image. In turn, the printhead has a plurality of fluid firing actuators arranged in a substantial column. The controller communicates with the printhead to identify active actuators given to fire during use to print the image. However, to prevent unsightly print quality from occurring during adjacent print swaths, for example, certain of the identified actuators are prevented from firing. Especially, actuators in the column further from a center of the column fire less frequently than those closer to the center.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENTS

In the following detailed description of the preferred embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical and/or other changes may be made without departing from the scope of the present invention. In accordance with the present invention, a handheld printer that minimizes printing defects is hereafter described.

Figure 1:
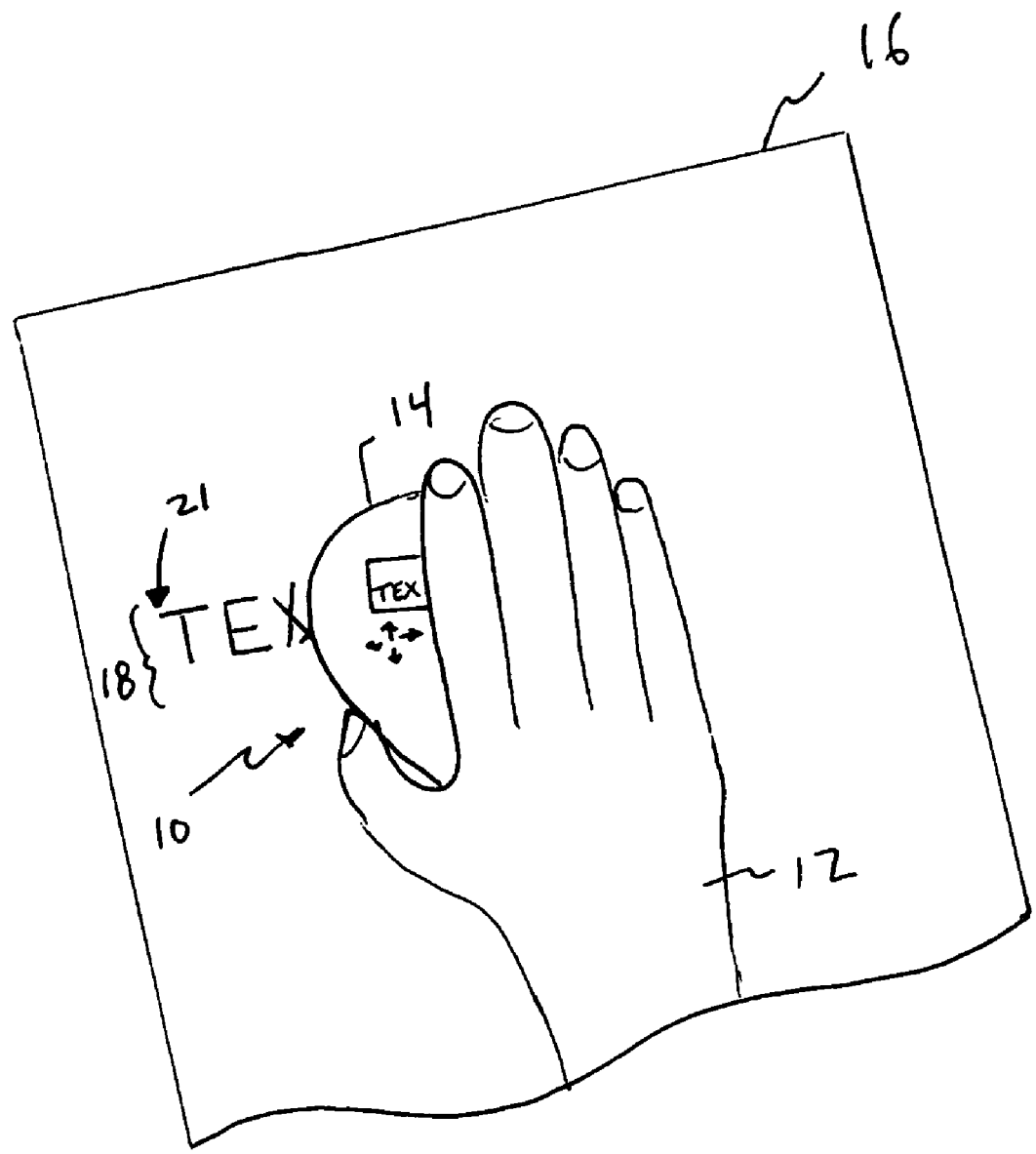
FIG. 1 is a diagrammatic view in accordance with the present invention of a handheld printer.

With reference to FIG. 1, a handheld printer of the invention that minimizes printing defects is given as 10. During use, an operator 12 maneuvers or manipulates a housing 14 of the printer back and forth over a substrate 16 in order to print an image 18. In various embodiments, the image will be text, figures, combinations of text and figures or the like. They will be typified in color and/or black and white.

Figure 2:
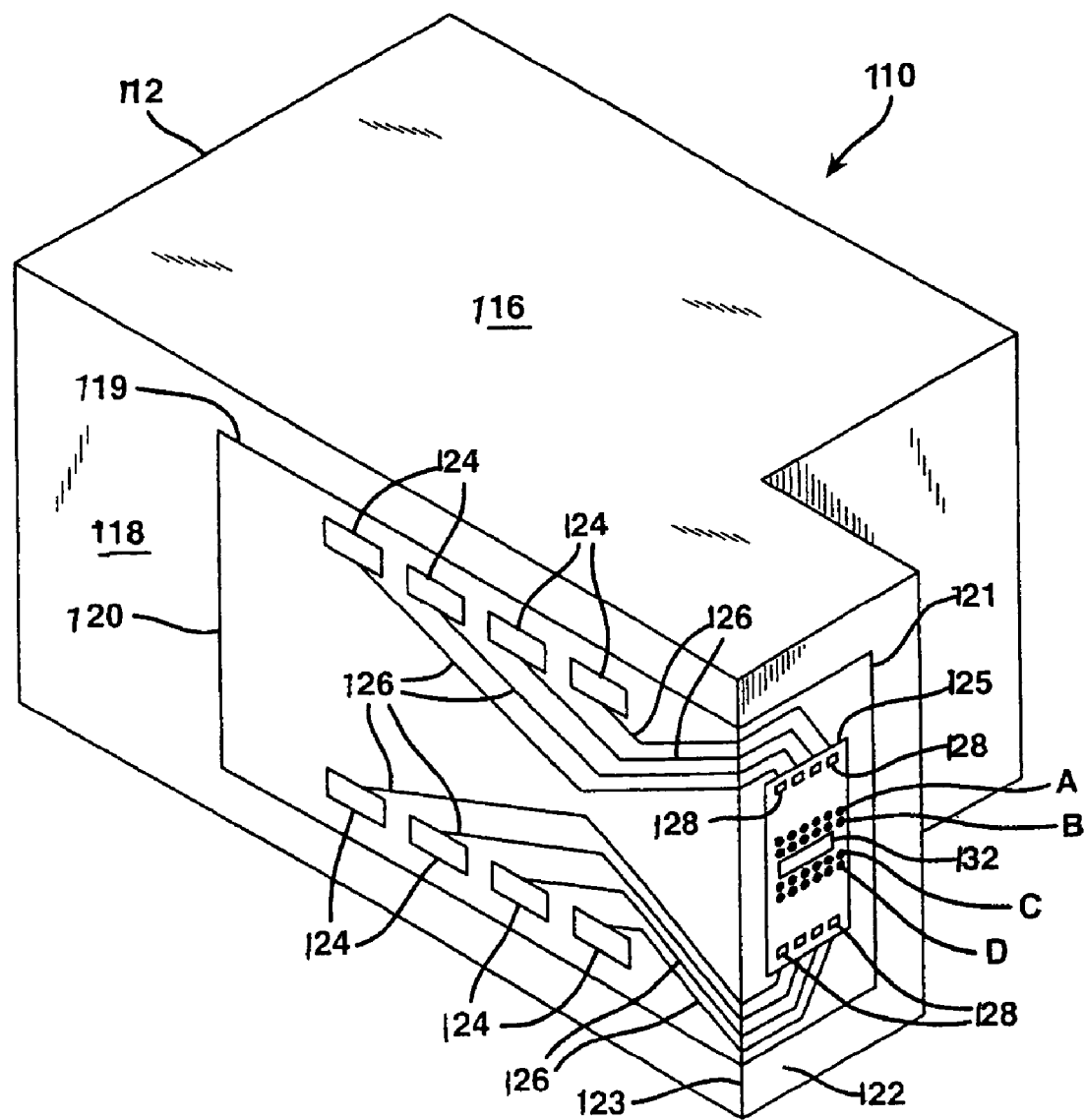
FIG. 2 is a diagrammatic view in accordance with the present invention of a representative inkjet printhead for use in the handheld printer of FIG. 1.

In FIG. 2, an inkjet printhead of the printer internal to the housing is shown generally as 110. It includes a housing 112 having a shape that depends upon the shape of the printer. The housing has at least one internal compartment 116 for holding an initial or refillable supply of ink. In one embodiment, the compartment contemplates a single chamber holding a supply of either black ink, cyan ink, magenta ink or yellow ink. In other embodiments, it contemplates multiple chambers containing multiple different colored inks. In one instance, it includes supplies of cyan, magenta and yellow ink. In still other embodiments, it includes plurals of black, cyan, magenta and/or yellow ink. It will be appreciated, however, that while the compartment 116 is shown as locally integrated within a housing 112 of the printhead, it may alternatively be separable from the housing 112 and/or printhead 110, for example.

Adhered to one surface 118 of the housing 112 is a portion 119 of a flexible circuit, especially a tape automated bond (TAB) circuit 120. At 121, another portion 121 is adhered to another surface 122. In this embodiment, the two surfaces 118, 122 are arranged perpendicularly to one another about an edge 123 of the housing. Electrically, the TAB circuit 120 supports a plurality of input/output (I/O) connectors 124 for connecting an actuator chip 125, also known as a heater chip, to the handheld printer during use. Pluralities of electrical conductors 126 exist on the TAB circuit to electrically connect and short the I/O connectors 124 to the input terminals (bond pads 128) of the actuator chip 125 and skilled artisans know various techniques for facilitating this. In an exemplary embodiment, the TAB circuit is a polyimide material and the electrical conductors and connectors are copper or aluminum-copper. For simplicity, FIG. 2 shows eight I/O connectors 124, eight electrical conductors 126 and eight bond pads 128 but present day printheads have larger quantities and any number is equally embraced herein. Also, skilled artisans will appreciate that the number of connectors, conductors and bond pads, while shown as equal to one another, may vary unequally in actual embodiments.

Figure 7C:
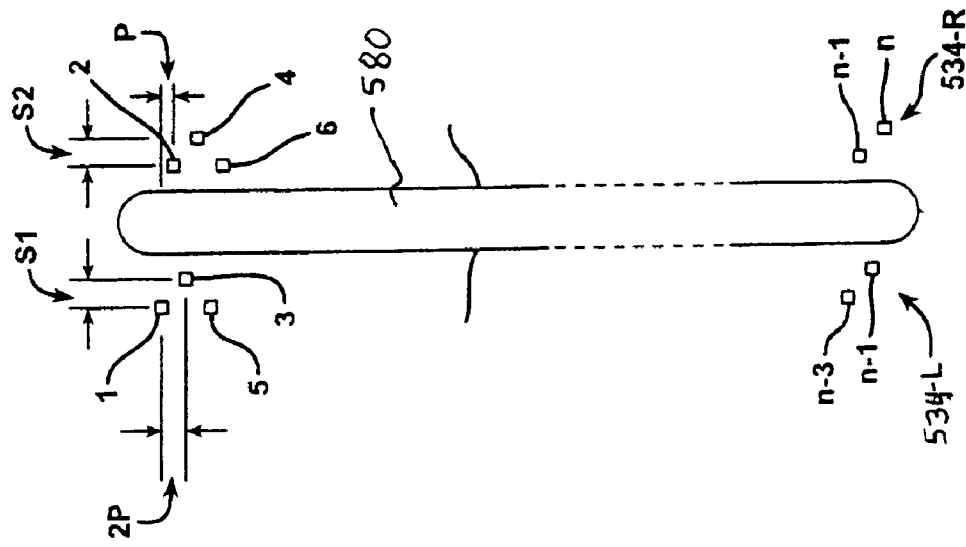
FIGS. 7A-7C are diagrammatic views in accordance with the present invention of representative columns of actuators in an inkjet printhead in a handheld printer.
Figure 7B:
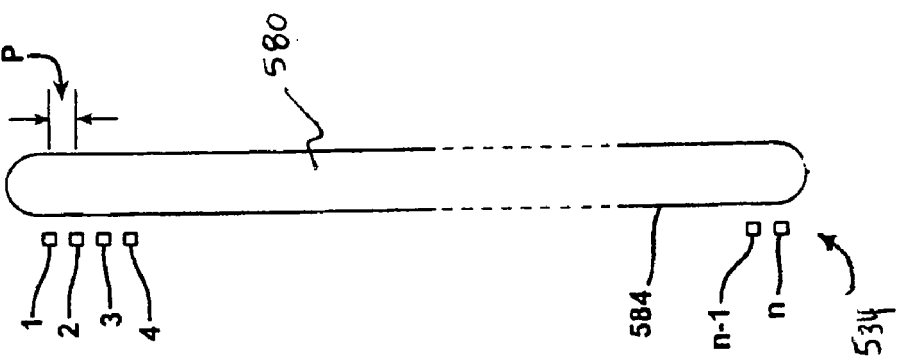
Figure 7A:
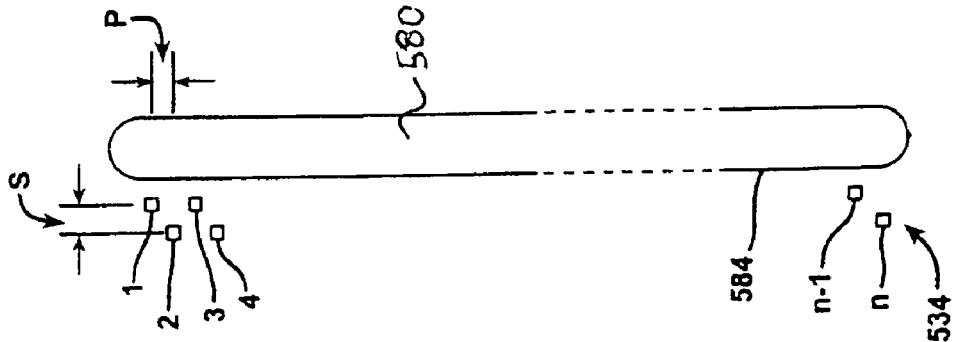

At 132, the actuator chip 125 contains at least one ink via (alternatively reference numeral 580 in FIGS. 7A-7C) that fluidly connects to the ink of the compartment 116. During printhead manufacturing, the actuator chip 125 is attached to the housing with any of a variety of adhesives, epoxies, etc., as is well known in the art. Many processes are also known that cut or etch the heater chip through a thickness thereof to form the ink via. Some preferred processes include, but are not limited to, grit blasting or etching, such as wet, dry, reactive-ion-etching, deep reactive-ion-etching, or the like. To eject ink, the actuator chip contains columns (column A-column D) of fluid firing actuators, such as thermal heaters. In other actuator chips, the fluid firing actuators embody piezoelectric elements, MEMs devices, and the like. In either, this crowded figure simplifies the actuators as four columns of six dots or darkened circles but in practice the actuators might number several dozen, hundred or thousand. Also, vertically adjacent ones of the actuators may or may not have a lateral spacing gap or stagger there between as shown in FIGS. 7A-7C. In general, however, the actuators have vertical pitch spacing, such as about $1/300^{th}$, $1/600^{th}$, $1/1200^{th}$, or $1/2400^{th}$ of an inch along the longitudinal extent of a via. Further, it is to be appreciated that the individual actuators are formed as a series of thin film layers made via growth, deposition, masking, patterning, photolithography and/or etching or other processing steps on a substrate, such as silicon. A nozzle member, such as a laser-ablated nozzle plate with pluralities of nozzles (which are sometimes referred to as nozzle holes), not shown, is adhered to or fabricated as another thin film layer on the actuator chip such that, in an exemplary embodiment, the nozzle holes generally align with and are positioned above the actuators to eject ink. In some embodiments, however, it may be advantageous to offset the actuator from the nozzle to minimize the adverse effects of cavitation from ink bubble collapse.

Figure 3:
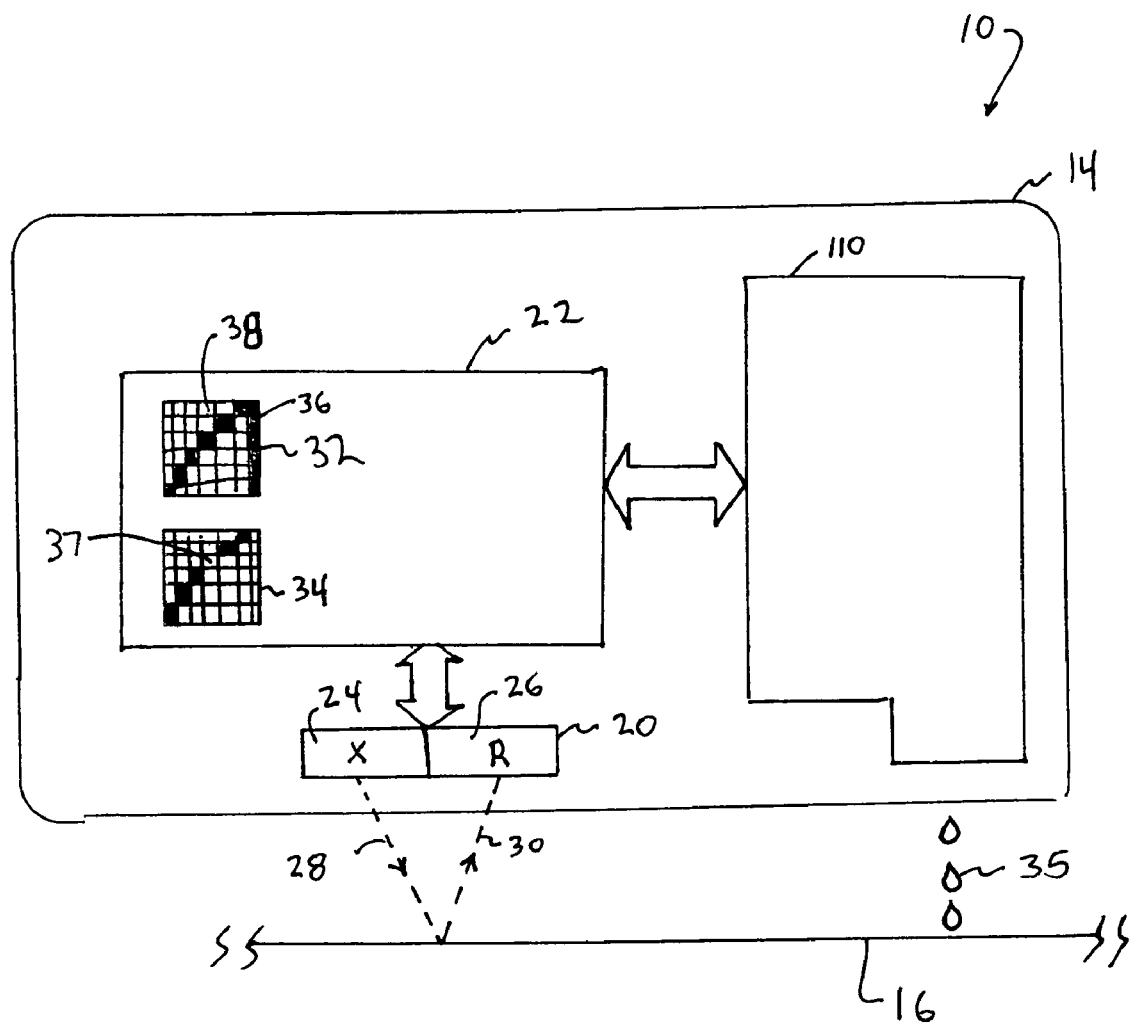
FIG. 3 is a diagrammatic view in accordance with the present invention of a representative arrangement of a handheld printer for improving print quality.

With reference to FIG. 3, in a greatly exaggerated view, the handheld printer 10 further includes a position sensor 20 and a controller 22. The position sensor, preferably of the optical type, includes a transmitter 24 and a receiver 26 that together shine light 28 and capture reflections 30 from the substrate 16. In this manner, the position of the housing, especially printhead 110 is made known at the controller regardless of random or predictable movement of the housing 14 by an operator.

Among other things, the controller 22 also includes a stored to-be-printed representation of an image 32. In turn, it correlates the position of the printhead, especially individual actuators, to the image. It then prints the image with ink 35 on the substrate 16 according to the image pattern 36 in the pixels 38. A has-been-printed image 34 may also be stored or accessed by the controller to keep track of future printing and to determine whether the image has been printed completely or not. In structure, the controller may embody an ASIC, discrete IC chips, firmware, software, a microprocessor, combinations thereof or the like.

In an alternate implementation, the to-be-printed image representation 32 is dynamically updated to remove pixels that have been printed so that the has-been printed information 34 is merged with the to-be-printed information.

To minimize print defects and improve print quality, the controller further identifies which fluid firing actuators of the printhead are active to fire in printing the image. From those, some are intentionally prevented from firing to create a dithered image having improved print quality, especially in contemplation of overlapped adjacent printing swaths. In one aspect, certain of the identified actuators are prevented from firing. Especially, actuators in the column of actuators further from a center of the column fire less frequently than those closer to the center.

Figure 4:
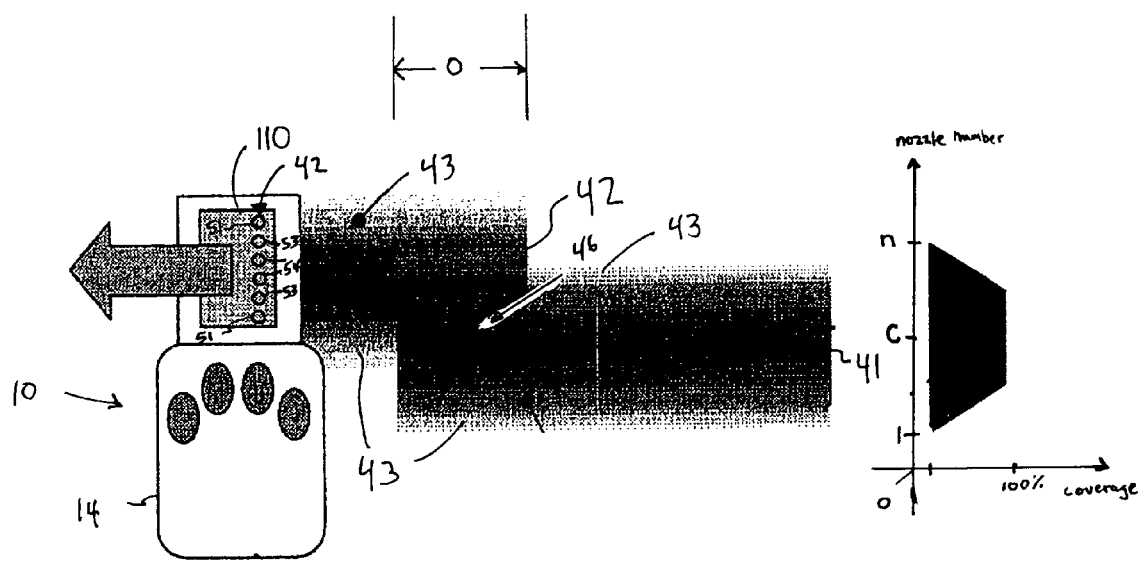
FIG. 4 is a diagrammatic view in accordance with the present invention of a representative handheld printer with printing swaths having dithered edges.

For example, FIG. 4 teaches a handheld printer 10 that made adjacent printing swaths 40 and 41 overlapping one another in a lateral direction of the figure labeled as O. In accomplishing this, certain numbers of the actuators in the column 42 were fired less frequently than others, despite all actuators needing to be fired per the fully black image being printed. In this regard, a fairly thin or dithered printed image appears in regions such as 43, but when overlapped printing swaths occur, the composite or resultant image at 46 occurs without any substantial printing defects. This improves print quality. In a representative embodiment, the column of actuators 42 is such that the terminally positioned actuators 51 fire less frequently than centrally positioned actuators closer to the center of the column such as actuators 53 and 54.

Figure 5:
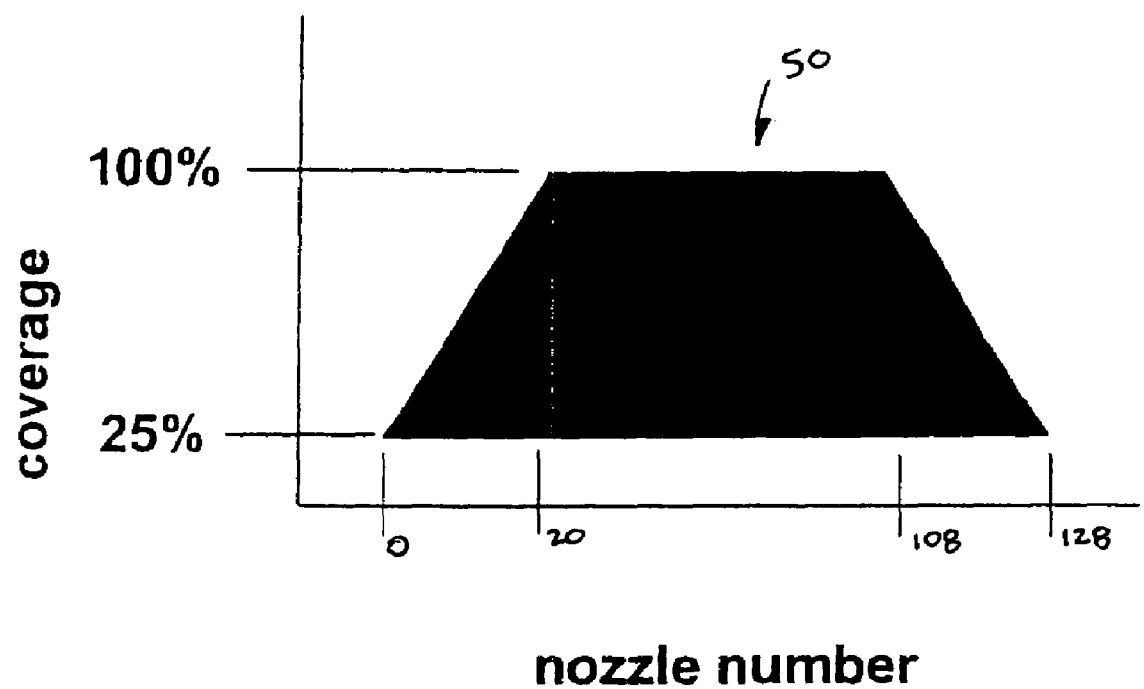
FIG. 5 is a graph in accordance with the present invention representative of an embodiment for utilizing columns of nozzles in an inkjet printhead to effectuate printing coverage.

Graphically, the actuator or nozzle number, from number 1 to some number n per a given column of fluid firing actuators 42, is laid adjacent the printing swath 41 to show image printing coverage in percent. As is seen, nozzle numbers further away from a center C yield lower coverage percent than do nozzle numbers closer to the center. In a preferred embodiment, this results because the terminally positioned actuators are fired less frequently than centrally positioned actuators. For instance, one embodiment contemplates that actuators with nozzle numbers 1 and n (e.g., actuators 51) fire only 1 out of 10 fire times per a given printing swath. In turn, actuators 2 and n–1 fire 2 out of 10 times, while actuators 3 and n–3 fire 3 out of 10 times and so on until nozzle numbers 10 and n–10 fire 10 out of 10 times. With reference to FIG. 5, a further detailed embodiment 50 is given per a column of actuators labeled with nozzle numbers 0 to 128. In this embodiment, full percent printing coverage is obtained for nozzles 20 through 108 while those outside the range produce less percent printing coverage. Of course, skilled artisans can contemplate other embodiments.

Figure 6A:
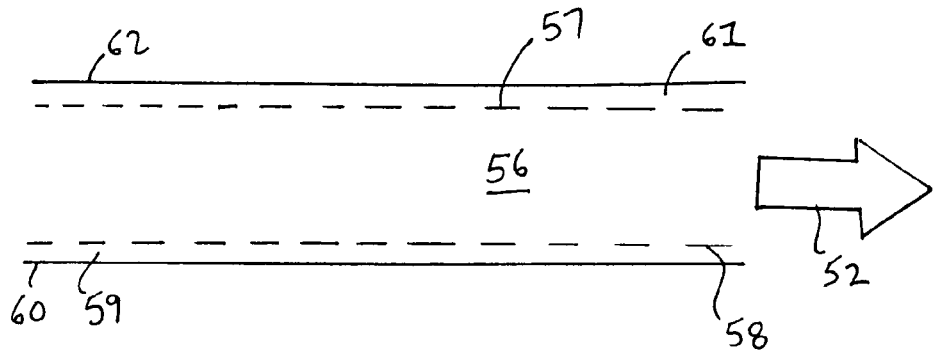
FIGS. 6A and 6B are diagrammatic views in accordance with the present invention of printing swaths of a handheld printer having improved print quality.
Figure 6B:
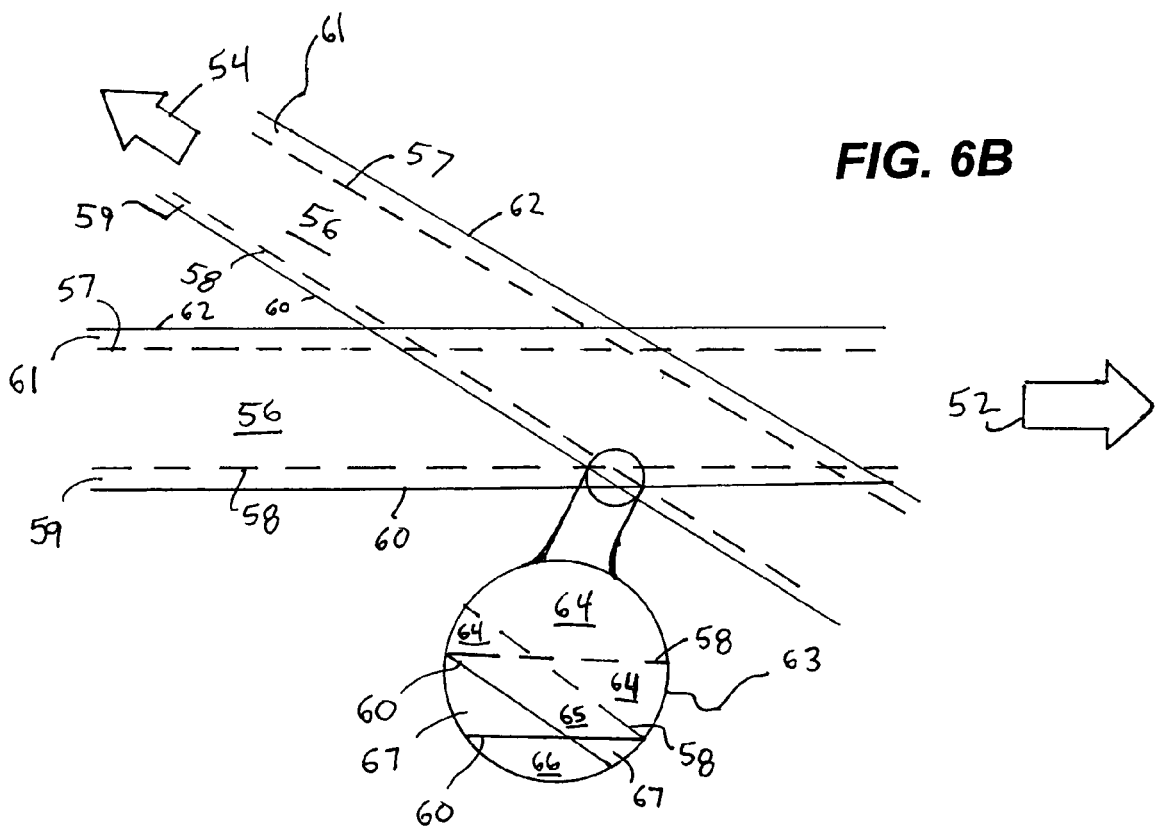

With reference to FIGS. 6A and 6B, two overlapping and adjacent printing swaths of the handheld printer are given as 52 and 54 in the direction of the arrows. As seen, both swaths are fully printed in the region 56 between the hash marks 57 and 58. Also, both are less than fully printed or dithered in the regions 59 and 61 given between the hash mark and the solid lines 60 and 62. In the inset 63, this then produces variously printed regions. In the regions labeled 64, the image is fully printed by either the first or second swaths 52, 54 of the printer having its actuators printing in a position of the column of fluid firing elements yielding 100% coverage. Conversely, region 66 has no printing because neither swath 52 or 54 ever passed over it. Regions 67, however, remain dithered, such as region 43 in FIG. 4, because only a single printing swath has covered it and done so with actuator(s) in a position of the column of fluid firing elements yielding less than 100% coverage. In the last region 65, coverage here is accomplished to an extent greater than dithered regions 67 but lesser than regions 64 because it has occurred with actuators within a position of the column of fluid firing elements yielding less than 100% coverage and more than one printing swath has been effectuated. Of course, still other coverage schemes are contemplated. For example, region 65 might be printed to 100% coverage in the second swath.

With reference to FIGS. 7A-7C, a column of fluid firing actuators could have designs alternate to those previously shown and still be embraced within the scope of the invention. For example, FIG. 7A shows actuators 1 through n of a given column 534 existing exclusively along one side 584 of an ink via 580. As seen, a slight horizontal spacing gap S exists between vertically adjacent ones of the actuators and such is on the order of about $3/1200^{th}$ of an inch. On the other hand, a vertical distance or pitch P exists between vertically adjacent actuators and such is on the order of about $1/300^{th}$, $1/600^{th}$, $1/1200^{th}$, or $1/2400^{th}$ of an inch. In FIG. 7B, vertically adjacent ones of actuators in column 534 are substantially linearly aligned with one another along an entirety of the length of the ink via 580. Although the actuators of FIGS. 7A, 7B have been shown exclusively on a left side of the ink via, alternate embodiments of the invention contemplate their location on the right side or on both sides. In FIG. 7C, a representative embodiment of actuators on both sides of the ink via includes those in columns 534-L and 534-R. In this instance, each column has a spacing gap S1 and S2 between vertically adjacent ones of actuators and both are substantially equal. Also, pitch P is given between sequentially numbered actuators such that a twice pitch (2P) vertical spacing exists between sequential odd or even numbered actuators. Of course, all embodiments contemplate more or the same number of ink vias shown.

Figure 8:
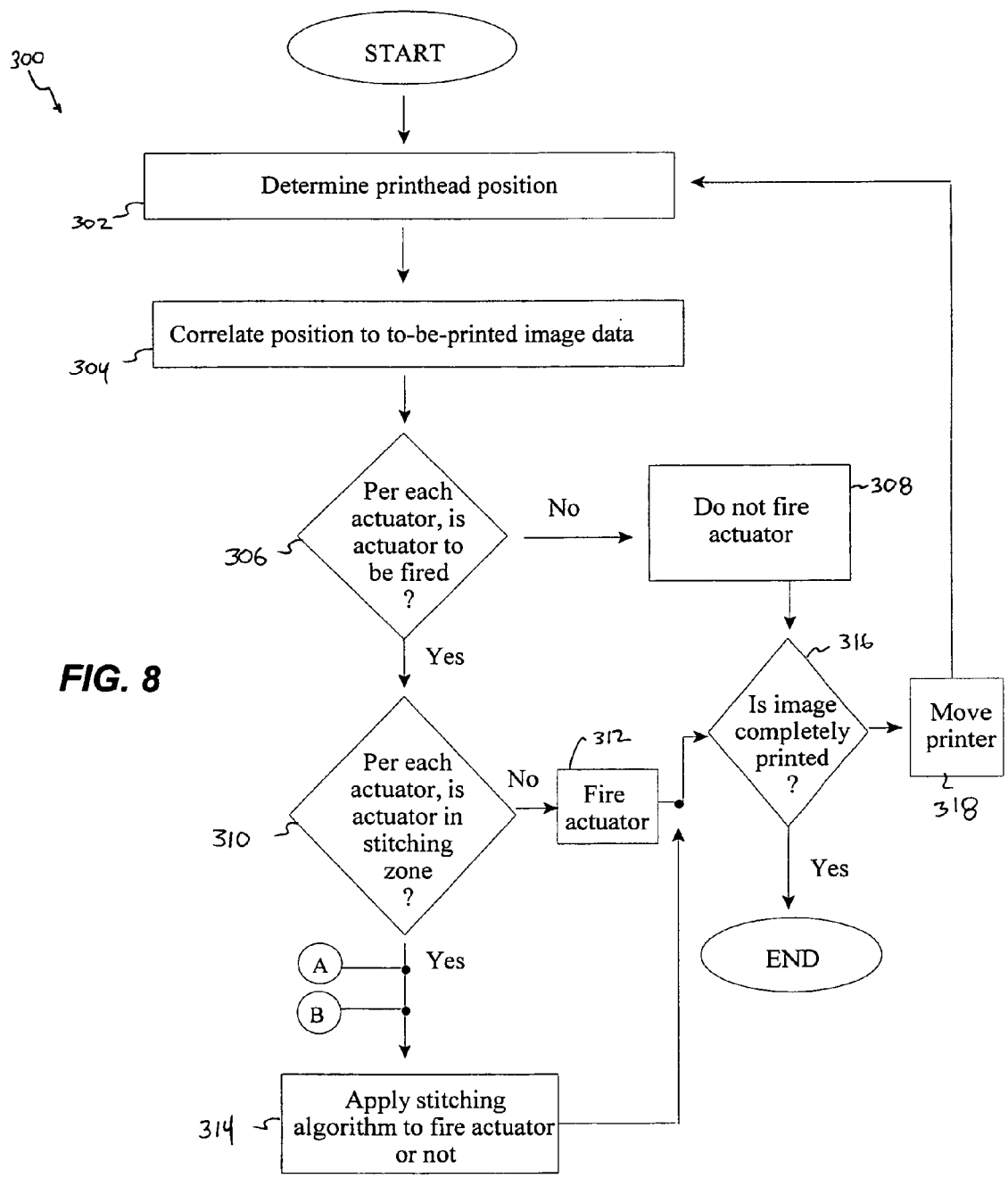
FIG. 8 is a flow chart in accordance with the present invention of a representative method for improving print quality in a handheld printer.

With reference to FIG. 8, a method for printing with a handheld printer to minimize printing defects is given as 300. At step 302, the printhead position of the printer is determined. As before, this is preferably done via the assistance of a position sensor in communication with a controller. At step 304, the printhead position is then correlated to the to-be-printed image. Again, preferably a controller of the printer effectuates this process. Then, per each of the actuators available to a printhead of the printer, it is determined whether the actuator is to be fired or not at that particular position in order to print the image, step 306. If it is not to be fired, e.g., because the actuator would avoid yielding an ink drop at a location commensurate with the to-be-printed image, the actuator is simply not fired at step 308. On the other hand, if the actuator is to be fired to create the image at hand, it can be considered an active actuator and a further inquiry is made. That is, at step 310, per each of the active or to be fired actuators, is the actuator in a dithering or stitching zone. In this regard, those actuators in a column of fluid firing actuators furthest away from a center of the column are in the zone whilst those closest to the center are not. FIG. 5, for example, shows a representative grouping of this concept for 128 actuators. Then, at step 312, if the actuator is not in the stitching zone (stated differently: if the actuator is in the 100% coverage zone), the actuator is simply fired and ink from the actuator is compiled on the substrate and serves to create the to-be-printed image. As an example, this corresponds to the region labeled 56 in FIGS. 6A and 6B. Conversely, those actuators indeed in the stitching zone, e.g., regions 43, 47, 59 in FIGS. 4, 6A and 6B, respectively, then need application of a stitching algorithm to fire them or not, step 314. As before, this could correspond to firing those actuators furthest from a center of the column of actuators less frequently than those nearest the center.

Finally, if the to-be-printed image is completely printed at step 316, the process ends. If not, the printer is moved at step 318 and repeated until eventually the entire to-be-printed image is rendered on the substrate. To ascertain this, it is preferred the controller 22 (FIG. 4) compares the to-be-printed image 32 to the has-been-printed image 34. In the event the images are the same, then printing is complete. Conversely, if they are different, printing is incomplete. Of course, certain de minimus exceptions could be programmed such that the controller would conclude complete printing even though an exact 100% percent comparison did not exist. Also, various noise could be introduced into the has-been-printed image to afford even better print quality. In this regard, certain random or predictable pixels 37 (FIG. 4) could be removed from a bitmap of pixels. Noise, as is well known, is common to stationary printing and not further described herein.

Figure 9:
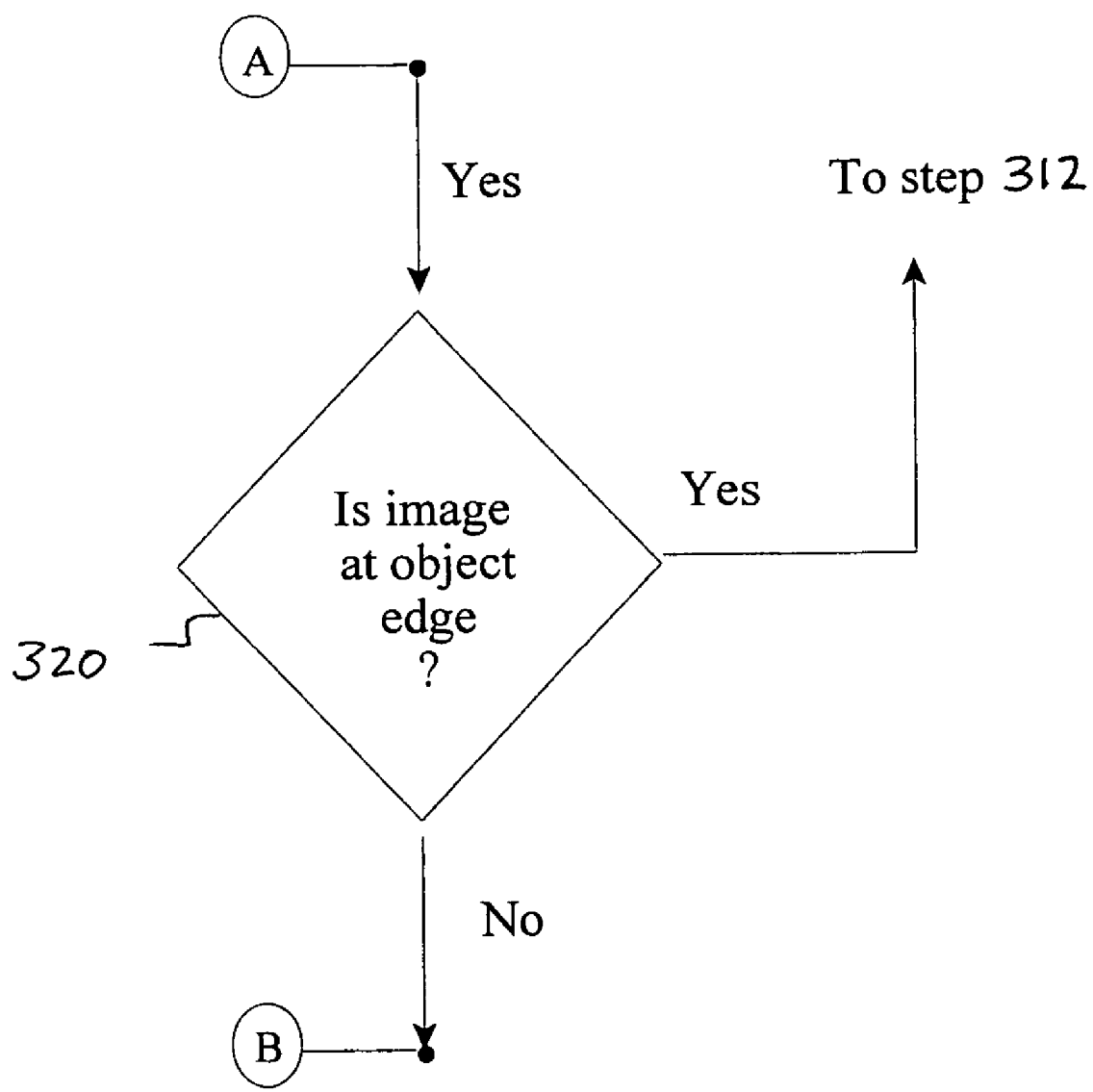
FIG. 9 is a flow chart in accordance with the present invention of an alternate embodiment of the flow chart of FIG. 8.

In still another embodiment, FIG. 9 explores the concept that certain instances of printing might not require the notion of dithering or stitching despite an actuator being located in a stitching zone. That is, step 320 is introduced at nodes A and B between steps 310 and 314 of FIG. 8 to further inquire whether the to-be-printed image is at an object edge, such as edge 21 in FIG. 1. If not, the actuator under consideration progresses as normal to the stitching algorithm of step 314 to minimize print defects. If so, the actuator under consideration progresses to being fired at step 312 regardless of its position in a column of fluid firing actuators. In this manner, it is contemplated that further printing swaths over the object edge would fairly unlikely require stitching. It is expected that banded ink from the printhead would not appear at an object edge because no future ink firing commands would be given to any actuators once the pixel of the to-be-printed image at the edge has been considered fired or printed.

In any embodiment, certain advantages of the invention over the prior art are readily apparent. For example, the invention at hand minimizes print banding and improves print quality. Less intuitively, whenever an operator using the handheld printer of the invention traverses visible voids in the image, the dithering of printing produces better quality. Also, because of simple logic in the apportioning of which active or to-be-fired actuators are prevented from being fired in a column of actuators, printing robustness is added while manufacturing costs are minimized.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures.

What is claimed:

1. A handheld printer, comprising:
an inkjet printhead having a plurality of fluid firing actuators; and
a controller communicating with the printhead to identify ones of the actuators requiring firing to print an image and to prevent firing some of the identified ones of the actuators to avoid print banding during use; wherein the controller correlates the location of the printhead to the image and proportions the actuators in the column further from a center of the column to fire less frequently than the actuators closer to the center.

2. The handheld printer of claim 1, wherein the controller identifies the ones of the actuators based on an actuator position in a column of fluid firing actuators.

3. The handheld printer of claim 2, wherein the controller causes firing select actuators in the column of fluid firing actuators at a terminal position less frequently during use than at other positions of the column of fluid firing elements.

4. The handheld printer of claim 2, wherein the controller is further configured to proportion firing select actuators closer to a center position of the column of fluid firing actuators more frequently than for other actuators further from the center position.

5. The handheld printer of claim 1, further including an optical sensor communicating with the controller to provide printhead location during use.

6. The handheld printer of claim 1, further including a stored to-be-printed image.

7. The handheld printer of claim 6, wherein the stored to-be-printed image has a dynamic update capability.

8. A handheld printer to be manipulated back and forth by an operator during use to print an image, comprising:
a hand maneuverable housing for an operator;
an inkjet printhead in the housing having a plurality of fluid firing actuators arranged in a substantial column;
a controller communicating with the printhead to cause firing or not of ones of the actuators during use when adjacent print swaths of the housing overlap;
a position sensor communicating with the controller to provide a location of the printhead during use,
wherein the controller correlates the location of the printhead to the image and proportions the actuators in the column further from a center of the column to fire less frequently than others of the actuators closer to the center.

9. The handheld printer of claim 8, wherein the controller has a dynamic update ability to alter the image during printing.

10. The handheld printer of claim 9, wherein the controller adds noise.

11. The handheld printer of claim 8, wherein the controller is capable of evaluating whether the image is completely printed.

12. A method of printing an image with a handheld printer having an inkjet printhead in a housing, comprising:
determining whether fluid firing actuators of the printhead should fire in printing the image; and
if the actuators should fire, identifying ones of the actuators to avoid firing based on a position in a column of fluid firing actuators, wherein the controller correlates the location of the printhead to the image and proportions the actuators in the column further from a center of the column to fire less frequently than the actuators closer to the center.

13. The method of claim 12, further including manipulating the housing relative to a substrate.

14. The method of claim 13, further including correlating a position of the printhead to the image.

15. The method of claim 12, wherein the identifying further includes proportioning the actuators in the column further from a center of the column to fire less frequently than others of the actuators closer to the center.

16. The method of claim 12, wherein the determining further includes dynamically updating a stored representation of the image.

17. The method of claim 16, further including adding noise.

* * * * *